United States Patent
Earnshaw et al.

(10) Patent No.: US 9,843,431 B2
(45) Date of Patent: *Dec. 12, 2017

(54) HANDLING SCHEDULING REQUEST COLLISIONS WITH AN ACK/NACK REPETITION SIGNAL

(71) Applicant: Blackberry Limited, Waterloo (CA)

(72) Inventors: Andrew Mark Earnshaw, Kanata (CA); Zhijun Cai, Ashburn, VA (US)

(73) Assignee: BlackBerry Limited, Waterloo, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/746,453

(22) Filed: Jun. 22, 2015

(65) Prior Publication Data
US 2015/0288503 A1    Oct. 8, 2015

Related U.S. Application Data

(63) Continuation of application No. 13/417,978, filed on Mar. 12, 2012, now Pat. No. 9,065,545.

(51) Int. Cl.
*H04L 5/00* (2006.01)
*H04W 72/12* (2009.01)
(Continued)

(52) U.S. Cl.
CPC .......... *H04L 5/0055* (2013.01); *H04B 1/56* (2013.01); *H04L 1/1671* (2013.01); *H04L 1/1854* (2013.01); *H04L 1/1858* (2013.01); *H04L 5/006* (2013.01); *H04L 5/14* (2013.01); *H04W 72/0413* (2013.01); *H04W 72/0446* (2013.01); *H04W 72/1268* (2013.01); *H04W 72/1284* (2013.01)

(58) Field of Classification Search
None
See application file for complete search history.

(56) References Cited

U.S. PATENT DOCUMENTS 8,295,253 B2    10/2012  Chen et al.
9,065,545 B2 *  6/2015   Earnshaw ............. H04L 1/1671
(Continued)

OTHER PUBLICATIONS

Extended European Search Report issued in related European Application No. 16154585.0 dated May 3, 2016.
(Continued)

*Primary Examiner* — Mohammad Adhami
(74) *Attorney, Agent, or Firm* — Fish & Richardson P.C.

(57) ABSTRACT

Systems and methods for handling of scheduling request collisions with an ACK/NACK repetition signal are provided. A pending scheduling request may be refrained from being transmitted due to the collision. The SR counter may be refrained from incrementing and the SR prohibit timer may be refrained from starting such that additional latency is not introduced into the scheduling request procedure. Alternatively, a pending scheduling request may be transmitted with the ACK/NACK repetition signal in the same subframe when the collision occurs. The ACK/NACK repetition signal may be transmitted on the SR PUCCH resource to indicate a positive scheduling request. If there is no pending scheduling request to be transmitted, the ACK/NACK repetition signal may be transmitted on the ACK/NACK PUCCH resource.

10 Claims, 6 Drawing Sheets

(51) Int. Cl.
  *H04L 1/16* (2006.01)
  *H04L 1/18* (2006.01)
  *H04B 1/56* (2006.01)
  *H04W 72/04* (2009.01)
  *H04L 5/14* (2006.01)

(56) References Cited

U.S. PATENT DOCUMENTS

| | | | |
|---|---|---|---|
| 2009/0219897 A1 | 9/2009 | Pajukoski et al. | |
| 2010/0195629 A1* | 8/2010 | Chen | H04L 1/1664 370/336 |
| 2010/0316096 A1* | 12/2010 | Adjakple | H04L 1/1887 375/211 |
| 2011/0134774 A1* | 6/2011 | Pelletier | H04W 52/365 370/252 |
| 2011/0176461 A1* | 7/2011 | Astely | H04B 7/2656 370/280 |
| 2012/0100864 A1* | 4/2012 | Susitaival | H04L 1/188 455/450 |
| 2012/0307773 A1 | 12/2012 | Tiirola et al. | |
| 2013/0028221 A1 | 1/2013 | Seo et al. | |
| 2014/0192763 A1 | 7/2014 | Eriksson et al. | |

OTHER PUBLICATIONS

TS 36.331, "3rd Generation Partnership Project; Technical Specification Group Radio Access Network; Evolved Universal Terrestrial Radio Access (E-UTRA); Radio Resource Control (RRC); Protocol specification". http://www.3gpp.org/ftp/Specs/html-info/36331.htm.

TS 36.213, "3rd Generation Partnership Project; Technical Specification Group Radio Access Network; Evolved Universal Terrestrial Radio Access (E-UTRA); Physical layer procedures". http://www.3gpp.org/ftp/Specs/html-info/36213.htm.

TS 36.321, "3rd Generation Partnership Project; Technical Specification Group Radio Access Network; Evolved Universal Terrestrial Radio Access (E-UTRA); Medium Access Control (MAC) protocol specification". http://www.3gpp.org/ftp/Specs/html-info/36321.htm.

Nokia Siemens Networks, Nokia Corporation; "Gaps for IDC Interference"; 3GPP TSG-RAN WG2 Meeting #77 (R2-120055); Dresden, Germany; Feb. 6-10, 2012; 15 pages.

Research in Motion UK Limited, Panasonic; Change Request; "Handling of a SR Collision with ACK/NACK Repetition"; 3GPP TSG-RAN WG2 Meeting #78 (R2-122723); Prague, Czech Republic; May 21-May 30, 2012; 3 pages.

Research in Motion UK Limited; "Handling of a SR Collision with ACK/NACK Repetition"; 3GPP TSG-RAN WG2 Meeting #77bis (R2-121282); Jeju, South Korea; Mar. 26-30, 2012; 4 pages.

International Search Report and Written Opinion of the International Searching Authority issued in International Application No. PCT/US2013/029011 dated Jul. 8, 2013; 13 pages.

International Preliminary Report on Patentability issued in International Application No. PCT/US2013/029011 dated Sep. 25, 2014.

* cited by examiner

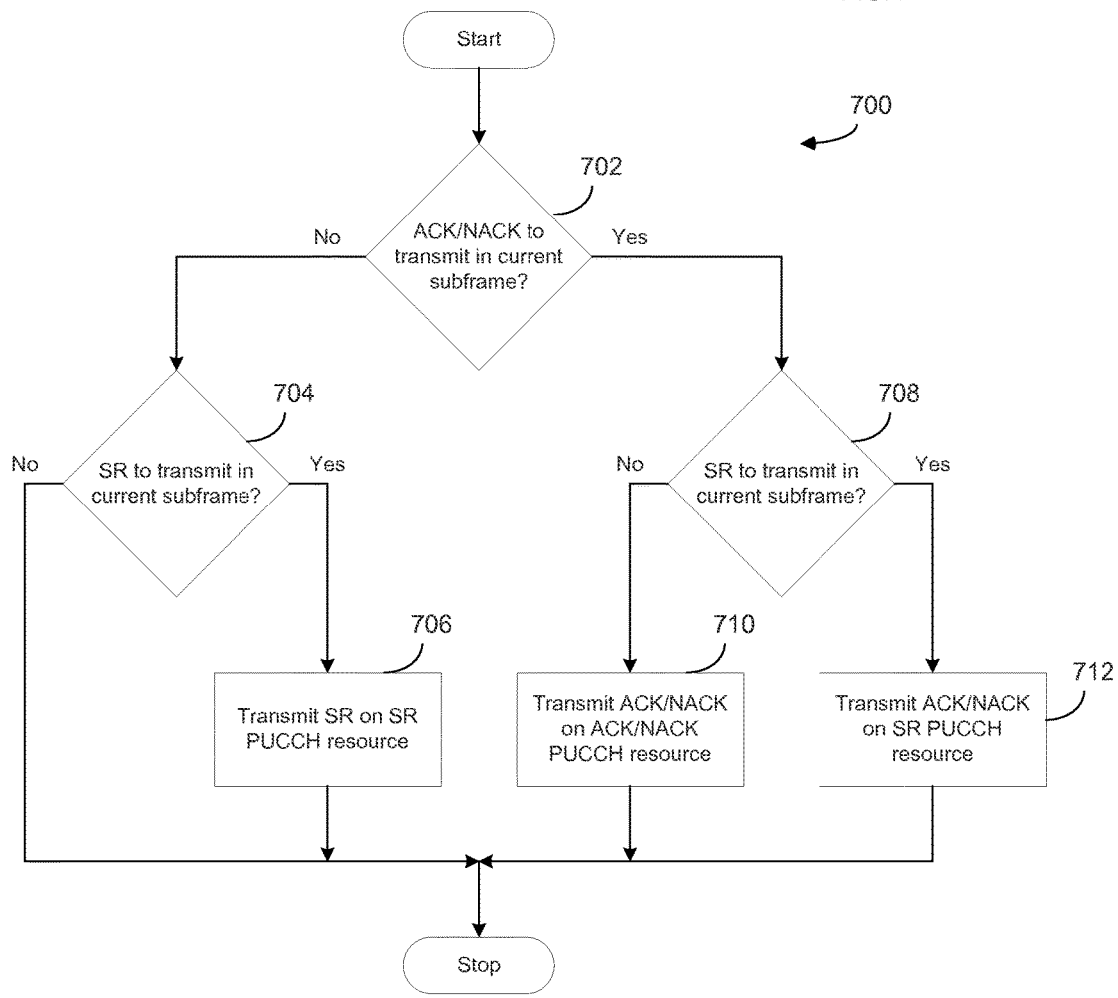

HANDLING SCHEDULING REQUEST COLLISIONS WITH AN ACK/NACK REPETITION SIGNAL

CLAIM OF PRIORITY

This application claims priority to U.S. patent application Ser. No. 13/417,978, filed on Mar. 12, 2012, the entire contents of which are hereby incorporated by reference.

FIELD

This disclosure relates to communication networks and, more particularly, to handling scheduling request collisions with an acknowledgement/negative acknowledgement (ACK/NACK) repetition signal.

BACKGROUND

In an evolved universal terrestrial radio access network (E-UTRAN), user equipment (UE) may request uplink resources for uplink data transmission by transmitting a scheduling request (SR) to a serving evolved Node B (eNB). The eNB may then provide a physical uplink shared channel (PUSCH) grant to the UE for uplink data transmission if uplink resources are available. A physical layer ACK/NACK transmission provides feedback information to the eNB regarding whether a transmitted downlink transport block on the physical downlink shared channel (PDSCH) is successfully received or not. An ACK/NACK signal may be repeatedly transmitted in consecutive uplink subframes to allow better reception quality at the eNB.

DESCRIPTION OF DRAWINGS

For a more complete understanding of this disclosure, reference is now made to the following brief description, taken in connection with the accompanying drawings and detailed description, wherein like reference numerals represent like parts.

FIG. 7 is a process flow chart illustrating an alternative method for handling a scheduling request collision with an ACK/NACK repetition signal using a physical layer of user equipment.

DETAILED DESCRIPTION

Figure 1:
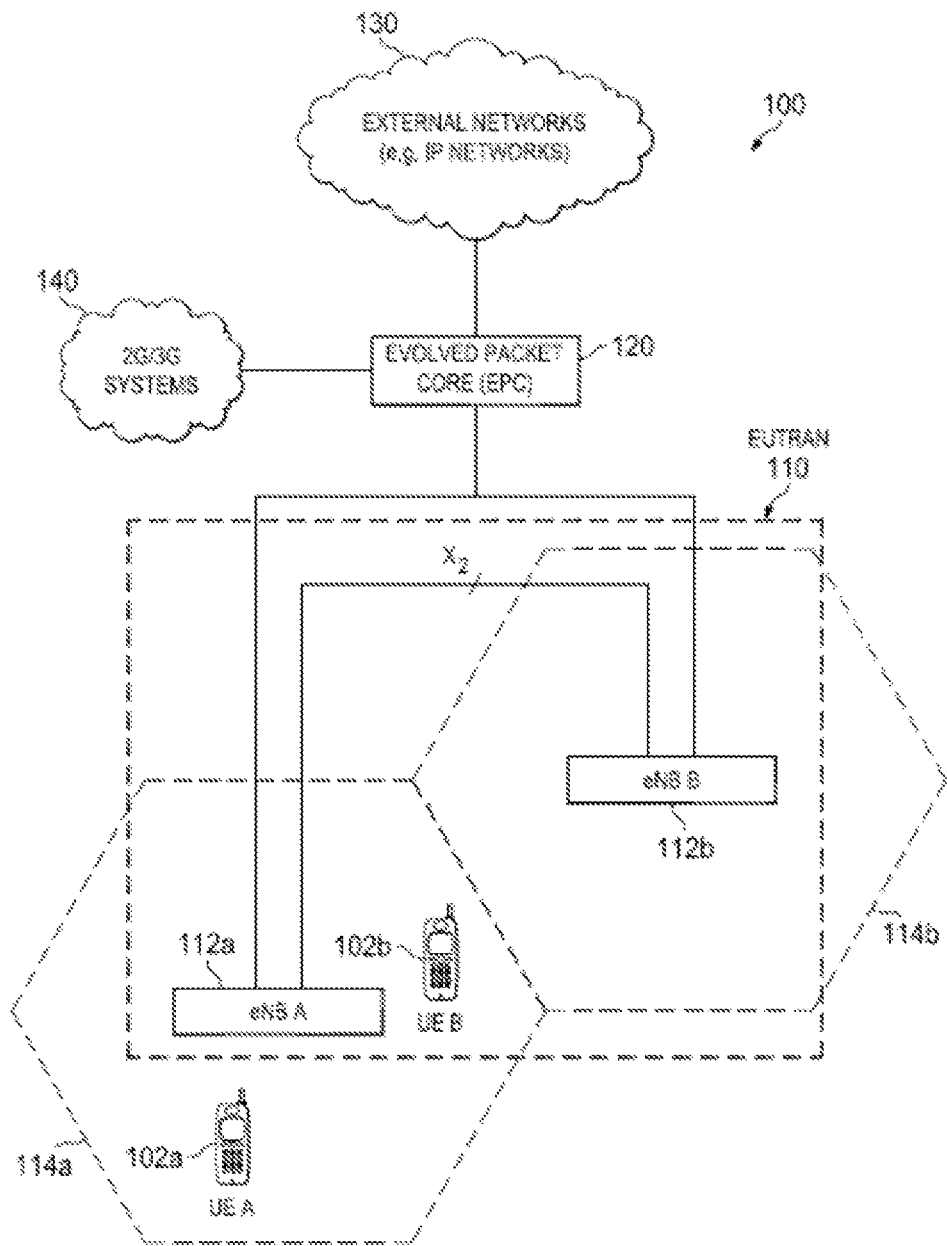
FIG. 1 is a schematic representation of an example wireless cellular communication system.

The present disclosure is directed to systems and methods for handling collisions between scheduling request (SR) transmissions and ACK/NACK repetition signals. In some implementations, an SR transmission collision occurs when a UE is configured to transmit an ACK/NACK repetition signal and a pending SR in the same subframe. In some implementations, an ACK/NACK repetition signal includes an ACK/NACK signal which is part of an ACK/NACK repetition sequence. The ACK/NACK signal may be repeated multiple times in consecutive uplink subframe in an ACK/NACK repetition sequence when ACK/NACK repetition is configured in the UE. To address these types of collisions, the UE can, in some implementations, execute one or more of the following: (1) handle the SR collisions with an ACK/NACK repetition signal in the same manner as for an SR collision with a measurement gap, i.e., the UE may refrain from incrementing an SR counter and refrain from starting an SR prohibit timer; or (2) transmit a positive SR simultaneously with an ACK/NACK repetition signal when ACK/NACK repetition is configured using the same approach as for the case when ACK/NACK repetition is not configured. In the first implementation, the UE may refrain from transmitting the pending SR when there is a collision with an ACK/NACK repetition signal. In addition to refraining from transmitting the pending SR, the UE may also refrain from incrementing the SR counter and refrain from starting the SR prohibit timer. The SR counter may count or otherwise track the number of transmitted SRs by the UE. The SR prohibit timer may prevent the pending SR from being transmitted before the SR prohibit timer expires. By refraining from incrementing the SR counter, the UE may still perform a maximum number of SR transmissions configured by an evolved Node B (eNB) serving the UE, which may optimize, maximize or otherwise increase the chance of success for the scheduling request procedure. By refraining from starting the SR prohibit timer, additional latency may be avoided when opportunities for SR transmissions occur at a later instance because the UE need not wait until the SR prohibit timer expires before transmitting the pending SR.

In the second implementation, the UE may transmit the pending SR and ACK/NACK repetition signal simultaneously when the collision occurs. A positive SR may be communicated to the eNB by transmitting the ACK/NACK repetition signal on the SR physical uplink control channel (PUCCH) resources rather than on ACK/NACK PUCCH resources. The eNB may detect the positive SR message when an ACK/NACK signal is received on the SR PUCCH resources. By transmitting the SR and ACK/NACK repetition signal substantially simultaneously or otherwise concurrently, the UE may obtain an uplink resource allocation relatively quickly by avoiding a random process procedure in order to obtain uplink transmission resources. Therefore, additional latency may not be introduced into the scheduling request procedure and subsequent assignment of an uplink grant by the eNB. Furthermore, the probability of the UE falling back to a random access procedure in order to obtain uplink transmission resources may be reduced.

FIG. 1 is a schematic representation of an example wireless cellular communication system 100 based on the third generation partnership project (3GPP) LTE, also known as Evolved Universal Terrestrial Radio Access (E-UTRA). The cellular network system 100 shown in FIG. 1 includes a plurality of base stations 112a and 112b. In the LTE example of FIG. 1, the base stations are shown as evolved Node Bs (eNBs) 112a and 112b. It will be understood that the base station may operate in any mobile environment, including macro cell, femto cell, pico cell, or the base station may operate as a node that can relay signals for other mobile and/or base stations. The example LTE telecommunications environment 100 of FIG. 1 may include one or more radio access networks 110, core networks (CNs) 120, and external networks 130. In certain implementations, the radio access networks may be E-UTRANs. In addition, in certain instances, core networks 120 may be evolved packet cores (EPCs). Further, there may be one or more mobile electronic devices 102a, 102b operating within the LTE system 100. In some implementations, 2G/3G systems 140, e.g., Global System for Mobile communication (GSM), Interim Standard 95 (IS-95), Universal Mobile Telecommunications System (UMTS) and CDMA2000 (Code Division Multiple Access) may also be integrated into the LTE telecommunication system 100.

In the example LTE system shown in FIG. 1, the EUTRAN 110 includes eNB 112a and eNB 112b. Cell 114a is the service area of eNB 112a and Cell 114b is the service area of eNB 112b. UEs 102a and 102b operate in Cell 114a and are served by eNB 112a. The EUTRAN 110 can include one or more eNBs (i.e. eNB 112a, eNB 112b) and one or more UEs (i.e., UE 102a and UE 102b) can operate in a cell. The eNBs 112a and 112b communicate directly to the UEs 102a and 102b. In some implementations, the eNB 112a or 112b may be in a one-to-many relationship with the UEs 102a and 102b, e.g., eNB 112a in the example LTE system 100 can serve multiple UEs (i.e., UE 102a and UE 102b) within its coverage area Cell 114a, but each of UE 102a and UE 102b may be connected only to one eNB 112a at a time. In some implementations, the eNBs 112a and 112b may be in a many-to-many relationship with the UEs, e.g., UE 102a and UE 102b can be connected to eNB 112a and eNB 112b. The eNB 112a may be connected to eNB 112b with which handover may be conducted if one or both of the UEs 102a and UE 102b travels from cell 114a to cell 114b. The UEs 102a and 102b may be any wireless electronic device used by an end-user to communicate, for example, within the LTE system 100. The UE 102a or 102b may be referred to as mobile electronic device, user device, mobile station, subscriber station, or wireless terminal. The UE 102a or 102b may be a cellular phone, personal data assistant (PDA), smart phone, laptop, tablet personal computer (PC), pager, portable computer, or other wireless communications device.

The UEs 102a and 102b may transmit voice, video, multimedia, text, web content and/or any other user/client-specific content. On the one hand, the transmission of some of these contents, e.g., video and web content, may include high channel throughput to satisfy the end-user demand. On the other hand, the channel between UEs 102a, 102b and eNBs 112 may be contaminated by multipath fading, due to the multiple signal paths arising from many reflections in the wireless environment. Accordingly, the UEs' transmission may adapt to the wireless environment. In short, the UEs 102a and 102b generate requests, send responses or otherwise communicate in different means with Enhanced Packet Core (EPC) 120 and/or Internet Protocol (IP) networks 130 through one or more eNBs 112. In this disclosure, the UEs 102a and 102b may receive a PUCCH resource assignment for the SR (e.g., the SR PUCCH resource index, SR periodicity and subframe offset) and ACK/NACK repetition signal (e.g. the ACK/NACK PUCCH resource index, the ACK/NACK repetition factor) from the eNBs 112. The UEs 102a and 102b may subsequently transmit SRs and ACK/NACK repetition signals using the PUCCH resources assigned by the eNBs 112. Further, the UEs 102a and 102b may receive an RRC message from the eNBs 112 indicating the SR prohibit timer value and the maximum number of SR transmissions. In some implementations, the UEs 102a and 102b may determine that a pending SR transmission collides with an ACK/NACK repetition signal, and thereby refrain from transmitting the pending SR transmission. In addition, the UEs 102a and 102b may refrain from incrementing the SR counter and refrain from starting the SR prohibit timer in order to optimize, maximize or otherwise increase the chance of success for the SR procedure. In some implementations, the UEs 102a and 102b may determine that a pending SR transmission collides with an ACK/NACK repetition signal, and transmit the pending SR and the ACK/NACK repetition signal in the same subframe. Instead of transmitting the ACK/NACK repetition signal on the ACK/NACK PUCCH resource, the UEs 102a and 102b may transmit the ACK/NACK repetition signal on the SR PUCCH resource such that both a positive SR request and the ACK/NACK repetition signal are communicated to the eNBs 112 in the same subframe.

A radio access network is part of a mobile telecommunication system which implements a radio access technology, such as UMTS, CDMA2000 and 3GPP LTE. In many applications, the Radio Access Network (RAN) included in a LTE telecommunications system 100 is called an EUTRAN 110. The EUTRAN 110 can be located between UEs 102a, 102b and EPC 120. The EUTRAN 110 includes at least one eNB 112. The eNB can be a radio base station that may control all or at least some radio related functions in a fixed part of the system. The at least one eNB 112 can provide radio interface within their coverage area or a cell for UEs 102a, 102b to communicate. The eNBs 112 may be distributed throughout the cellular network to provide a wide area of coverage. The eNB 112 directly communicates to one or more UEs 102a and 102b, other eNBs, and the EPC 120. In this disclosure, the eNBs 112 may configure an SR PUCCH resource and an ACK/NACK repetition signal PUCCH resource for the UEs 102a and 102b. The eNBs 112 may decode the SRs and ACK/NACK repetition signals from the UEs 102a and 102b on the assigned PUCCH resource. A positive SR may be detected at the eNBs 112 when there is a presence of signal on the assigned SR PUCCH resource for the UEs 102a and 102b. The ACK/NACK repetition signal may be decoded on the ACK/NACK PUCCH resource. In some implementations, the eNBs 112 may decode the ACK/NACK repetition signal on the SR PUCCH resource when the pending SR transmission collides with the ACK/NACK repetition signal for UEs 102a and 102b. The eNBs 112 may determine that SRs from the UEs 102a and 102b are received in the same subframe as the ACK/NACK repetition signals.

The eNB 112 may be the end point of the radio protocols towards the UEs 102a, 102b and may relay signals between the radio connection and the connectivity towards the EPC 120. In certain implementations, the EPC 120 is the main component of a core network (CN). The CN can be a backbone network, which may be a central part of the telecommunications system. The EPC 120 can include a mobility management entity (MME), a serving gateway (SGW), and a packet data network gateway (PGW). The MME may be the main control element in the EPC 120 responsible for the functionalities comprising the control plane functions related to subscriber and session management. The SGW can serve as a local mobility anchor, such that the packets are routed through this point for intra EUTRAN 110 mobility and mobility with other legacy 2G/3G systems 140. The SGW functions may include the user plane tunnel management and switching. The PGW may provide connectivity to the services domain comprising external networks 130, such as the IP networks. The UE 102, EUTRAN 110, and EPC 120 are sometimes referred to as the evolved packet system (EPS).

Though described in terms of FIG. 1, the present disclosure is not limited to such an environment. In general, cellular telecommunication systems may be described as cellular networks made up of a number of radio cells, or cells that are each served by a base station or other fixed transceiver. The cells are used to cover different areas in order to provide radio coverage over an area. Example cellular telecommunication systems include Global System for Mobile Communication (GSM) protocols, Universal Mobile Telecommunications System (UMTS), 3GPP Long Term Evolution (LTE), and others. In addition to cellular telecommunication systems, wireless broadband communication systems may also be suitable for the various implementations described in the present disclosure. Example wireless broadband communication systems include IEEE 802.11 wireless local area network, IEEE 802.16 WiMAX network, etc.

Figure 2:
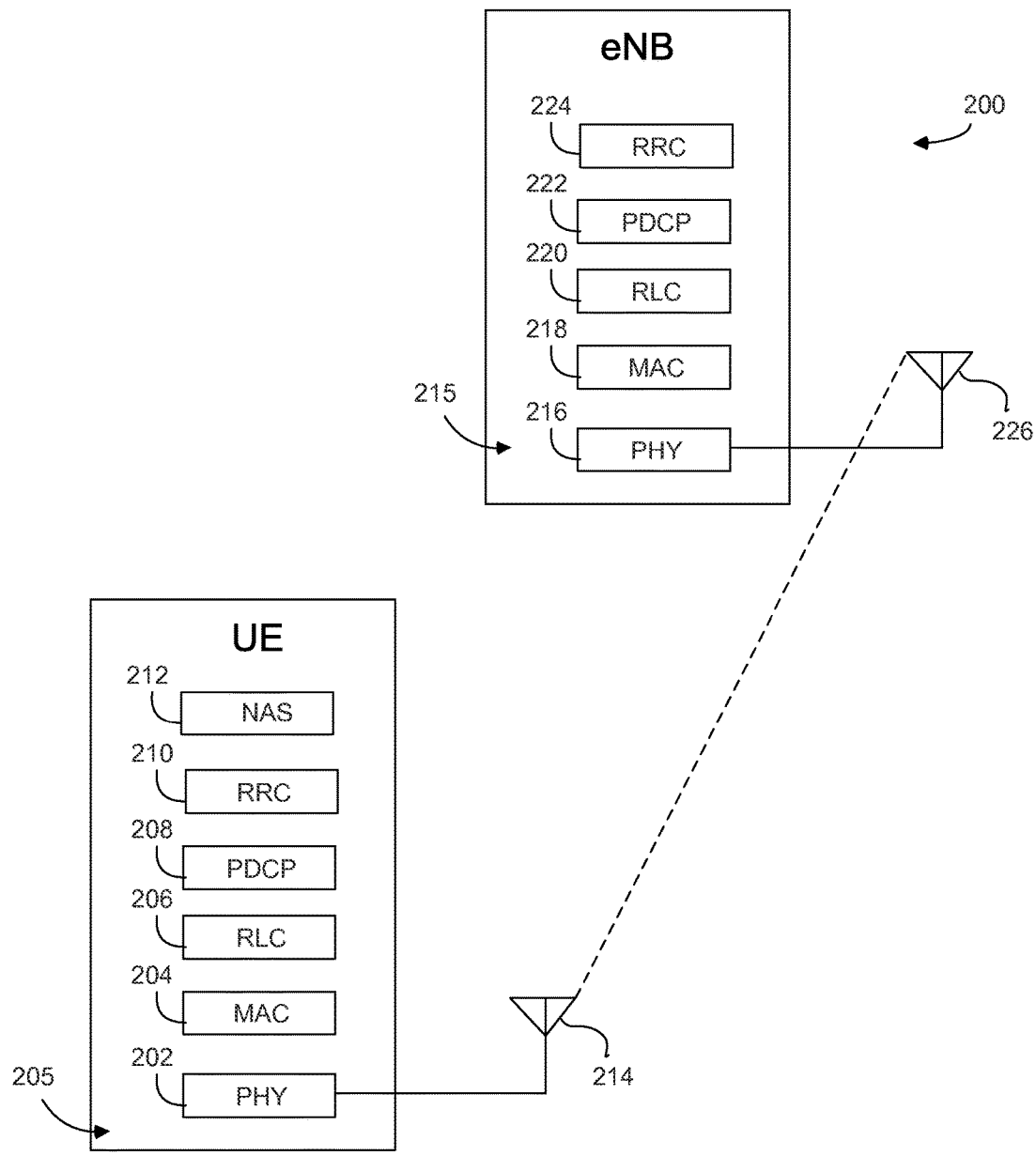
FIG. 2 is a schematic block diagram illustrating various layers of an access node and user equipment in a wireless communication network.

FIG. 2 is a schematic block diagram 200 illustrating various layers of an access node and user equipment in a wireless communication network according to one implementation. The illustrated system 200 includes a UE 205 and an eNB 215. The eNB can be referred to as a "network," "network component," "network element," "access node," or "access device." FIG. 2 shows only these two devices (alternatively, referred to as "apparatuses" or "entities") for illustrative purposes, and a skilled artisan may appreciate that the system 200 can further include one or more of such devices, depending on the implementations. The eNB 215 can communicate wirelessly with the UE 205.

Each of the devices 205 and 215 includes a protocol stack for communications with other devices via wireless and/or wired connection. The UE 205 can include a physical (PHY) layer 202, a medium access control (MAC) layer 204, a radio link control (RLC) layer 206, a packet data convergence protocol (PDCP) layer 208, a radio resource control (RRC) layer 210, and a non-access stratum (NAS) layer 212. The UE 205 may also include one or more antennas 214 coupled to the PHY layer 202. In the illustrated implementation, a "PHY layer" can also be referred to as "layer 1." The other layers (MAC layer, RLC layer, PDCP layer, RRC layer and above) can be collectively referred to as a "higher layer(s)." The SRs and ACK/NACK repetition signals described in this disclosure may be transmitted by the physical layer 202 of the UE 205. The SR counter, SR prohibit timer, and HARQ processes (described in more detail below) may be maintained by the MAC layer 204 of the UE 205.

The eNB 215 can also include a physical (PHY) layer 216, a medium access control (MAC) layer 218, a radio link control (RLC) layer 220, a packet data convergence protocol (PDCP) layer 222, and a radio resource control (RRC) layer 224. In case of user plane communication for data traffic, the RRC layer may not be involved. The eNB 215 may also include one or more antennas 226 coupled to the PHY layer 216. The SRs and ACK/NACK repetition signals described in this disclosure may be decoded by the physical layer 216 of the eNB 215. The PUCCH resource for SR, PUCCH resource for ACK/NACK repetition signal, value of SR prohibit timer and the number of maximum SR transmissions may be configured by the RRC layer 224 of the eNB 215 and be signaled to the UE 205.

Communications between the devices, such as between the eNB 215 and the UE 205, generally occur within the same protocol layer between the two devices. Thus, for example, communications from the RRC layer 224 at the eNB 215 travel through the PDCP layer 222, the RLC layer 220, the MAC layer 218, and the PHY layer 216, and are sent over the PHY layer 216 and the antenna 226 to the UE 205. When received at the antenna 214 of the UE 205, the communications travel through the PHY layer 202, the MAC layer 204, the RLC layer 206, the PDCP layer 208 to the RRC layer 210 of the UE 205. Such communications are generally done utilizing a communications sub-system and a processor, as described in more detail below.

Figure 3:
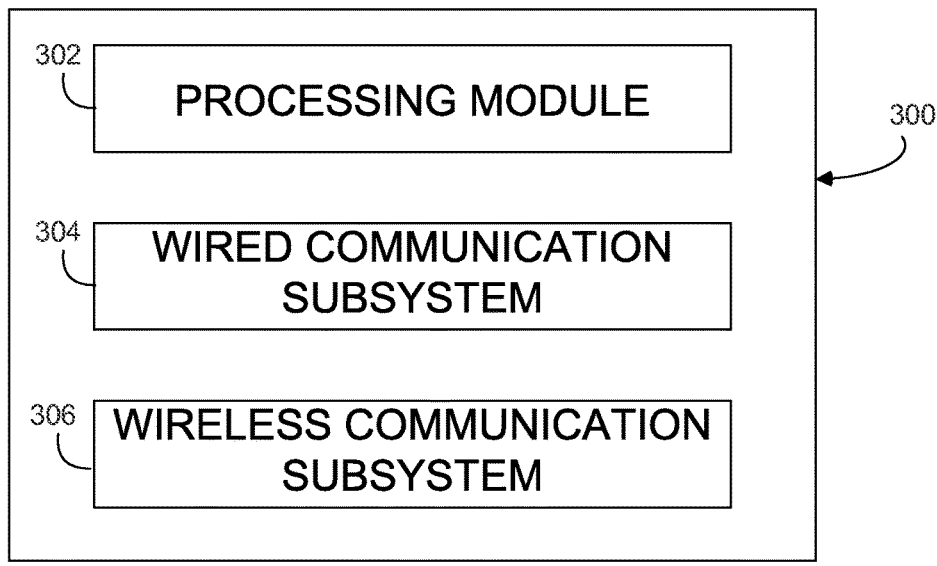
FIG. 3 is a schematic block diagram illustrating an access node device.

FIG. 3 is a schematic block diagram 300 illustrating an access node device according to one implementation. The illustrated device 300 includes a processing module 302, a wired communication subsystem 304, and a wireless communication subsystem 306. The processing module 302 can include one or more processing components (alternatively referred to as "processors" or "central processing units (CPUs)") capable of executing instructions related to one or more of the processes, steps, or actions described above in connection with one or more of the implementations disclosed herein. The processing module 302 can also include other auxiliary components, such as random access memory (RAM), read only memory (ROM), secondary storage (for example, a hard disk drive or flash memory), etc. The processing module 302 can form at least part of the layers described above in connection with FIG. 2. In some implementations, the processing module 302 may be configured to decode the received SR and ACK/NACK repetition signal from the UE on a SR PUCCH resource. Further, the processing module 302 may determine that a positive SR from the UE is received in the same subframe as the ACK/NACK repetition signal when an ACK/NACK repetition signal is detected on the SR PUCCH resource. In some implementations, the processing module 302 may be configured not to decode the received SR and ACK/NACK repetition signals from the UE in the same subframe. The processing module 302 can execute certain instructions and commands to provide wireless or wired communication, using the wired communication subsystem 304 or a wireless communication subsystem 306. A skilled artisan may readily appreciate that various other components can also be included in the device 300.

Figure 4:
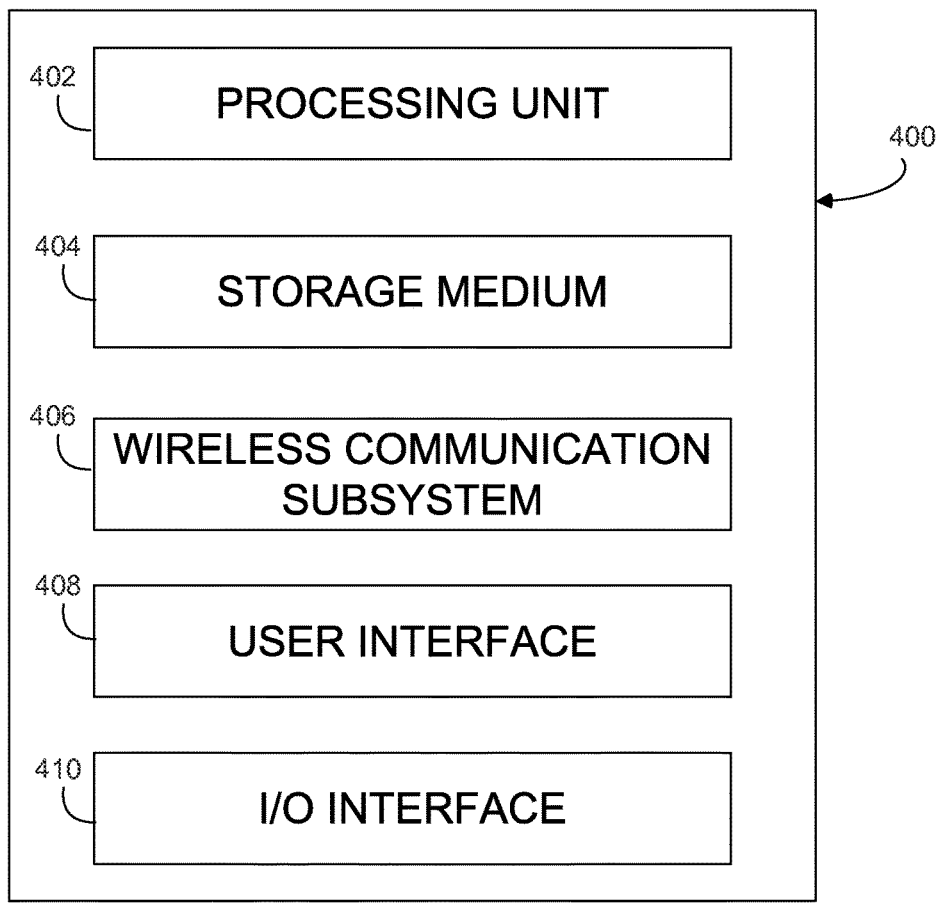
FIG. 4 is a schematic block diagram illustrating a user equipment device.

FIG. 4 is a schematic block diagram 400 illustrating a user equipment device according to one implementation. The illustrated device 400 includes a processing unit 402, a computer readable storage medium 404 (for example, ROM or flash memory), a wireless communication subsystem 406, a user interface 408, and an I/O interface 410.

Similar to the processing module 302 of FIG. 3, the processing unit 402 can include one or more processing components (alternatively referred to as "processors" or "central processing units (CPUs)") configured to execute instructions related to one or more of the processes, steps, or actions described above in connection with one or more of the implementations disclosed herein. In some implementations, the processing unit 402 may be configured to determine whether a pending SR transmission may collide with the transmission of an ACK/NACK repetition signal, and, responsive to the determining, to refrain from transmitting the pending SR transmission. Further, the processing unit 402 may be configured to refrain from incrementing the SR counter and/or refrain from starting the SR prohibit timer, responsive to determining the collision. In some implementations, the processing unit 402 may be configured to determine whether a pending SR transmission may collide with the transmission of an ACK/NACK repetition signal, and, responsive to determining the collision, transmit the pending SR and ACK/NACK repetition signal in the same subframe.

The processing unit 402 may also include other auxiliary components, such as random access memory (RAM) and read only memory (ROM). The computer readable storage medium 404 can store an operating system (OS) of the device 400 and various other computer executable software programs for performing one or more of the processes, steps, or actions described above.

The wireless communication subsystem 406 is configured to provide wireless communication for data and/or control information provided by the processing unit 402. The wireless communication subsystem 406 can include, for example, one or more antennas, a receiver, a transmitter, a local oscillator, a mixer, and/or a digital signal processing (DSP) unit. In some implementations, the subsystem 406 can support multiple input multiple output (MIMO) transmissions.

The user interface 408 can include, for example, one or more of a screen or touch screen (for example, a liquid crystal display (LCD), a light emitting display (LED), an organic light emitting display (OLED), a microelectromechanical system (MEMS) display), a keyboard or keypad, a trackball, a speaker, and/or a microphone. The I/O interface 410 can include, for example, a universal serial bus (USB) interface. A skilled artisan may readily appreciate that various other components can also be included in the device 400.

Figure 5A:
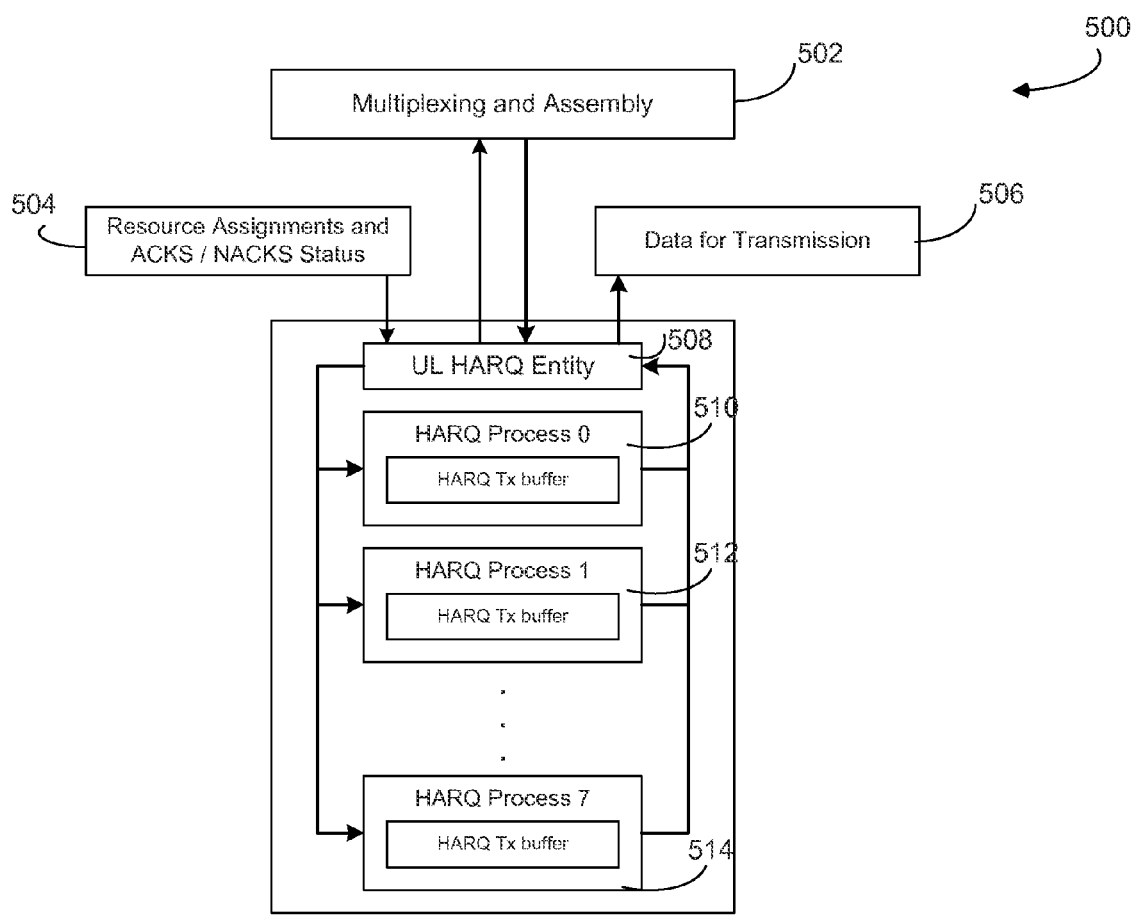
FIG. 5A is a schematic block diagram illustrating an uplink hybrid automatic repeat request (HARQ) entity in user equipment.

FIG. 5A is a schematic block diagram 500 illustrating an uplink (UL) hybrid automatic repeat request (HARQ) entity at a user equipment device. As shown in FIG. 5A, an Uplink HARQ Entity 508 maintains a number of parallel Uplink HARQ Processes 510-514 allowing uplink transmissions to take place continuously while waiting for the HARQ feedback on the successful or unsuccessful reception of previous transmissions. A Resource Assignments and ACK/NACK Status Entity 504 may inform the Uplink HARQ Entity 508 about uplink transmission resource assignments and received ACK/NACK status from the Physical Layer 202 (shown in FIG. 2). The Uplink HARQ Entity 508 may interact with a Multiplexing and Assembly Entity 502 at the UE to obtain a MAC protocol data unit (PDU) for transmission from the Multiplexing and Assembly Entity 502. The Uplink HARQ Entity 508 may instruct a Data for Transmission Entity 506 to generate a new transmission, an adaptive retransmission, or a non-adaptive retransmission after receiving resource assignments, or ACK/NACK notification from the resource assignments and ACK/NACK Status Entity 504. Although eight uplink HARQ processes (510, 512, 514) are shown in FIG. 5A, this is illustrative only and more or fewer than 8 uplink HARQ processes may be present.

Figure 5B:
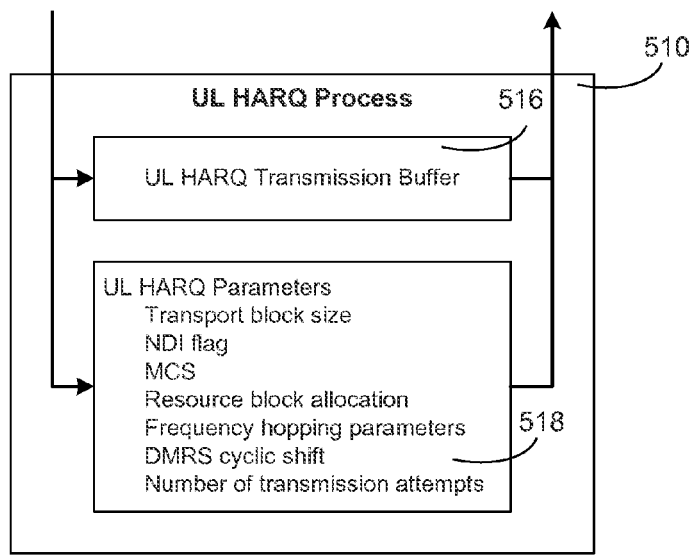
FIG. 5B is a schematic block diagram illustrating an uplink HARQ process module in user equipment.

FIG. 5B is a schematic block diagram illustrating the Uplink HARQ Processing Module 510. The illustrated Uplink HARQ Process Module 510 includes an Uplink Transmission Buffer 516 and various Uplink HARQ Parameters 518. The Uplink HARQ Transmission Buffer 516 stores the information bits that are to be transmitted and may be more generally referred to as an HARQ buffer. The Uplink HARQ Parameters 518 may include various transmission parameters such as transport block size, new data indicator (NDI) flag, modulation and coding scheme (MCS), resource block allocation, frequency hopping parameters, demodulation reference signal (DMRS) cyclic shift, number of transmission attempts, etc.

When a downlink (DL) transport block is received on a physical downlink shared channel (PDSCH) for a UE, the UE may signal a corresponding ACK (i.e. the PDSCH transport block was successfully decoded) or NACK (i.e. the PDSCH transport block was not successfully decoded) on the uplink. This is normally accomplished in one of two ways. If a PUSCH transmission is made in the same subframe, then the encoded downlink ACK/NACK information is punctured into that PUSCH transmission. If there is no PUSCH transmission made in the same subframe, then the downlink ACK/NACK information is signaled via the PUCCH. A UE may be configured with ACK/NACK repetition, which may allow, for example, a greater probability of correct ACK/NACK detection. ACK/NACK repetition may be configured by the eNB. ACK/NACK repetition may be useful, for example, if a UE has a poor transmission channel, or an otherwise challenging channel condition, between itself and its serving eNB. When the UE is configured with ACK/NACK repetition, an ACK/NACK transmitted on the uplink in response to a downlink reception on the PDSCH is repeated multiple times, for example, 2, 4, or 6 times (depending upon the configured repetition factor) in consecutive uplink subframes. The ACK/NACK signal which is part of an ACK/NACK repetition sequence may be transmitted on an appropriate PUCCH resource.

Collisions may occur when part of the ACK/NACK repetition sequence is configured to transmit at the same subframe as a pending scheduling request transmission. The UE may transmit a pending scheduling request to its serving eNB to request uplink resources for uplink data transmission, e.g., when new uplink traffic arrives at the UE and the UE requires uplink resources for new data transmission. Scheduling requests are normally transmitted on a PUCCH resource assigned by the eNB. The eNB may provide configuration information about the PUCCH resources to be used by a particular UE, and the periodicity and offset within that period specifying when the UE is allowed to use the PUCCH resources. This allows a small number of PUCCH resources to be shared among a larger number of UEs for SR purposes. In some implementations, a presence of SR transmission may imply that the UE is requesting uplink resources, while an absence of SR transmission may imply that the UE is not requesting uplink resources. A positive SR may be transmitted via PUCCH format 1 when the pending SR does not collide with another control signal (e.g., an ACK/NACK signal). The PUCCH format 1 communicates information simply by its presence or absence and is thus fairly reliable even in challenging channel conditions between the UE and the eNB. In addition to the PUCCH resource index, the eNB may also provide an SR configuration index for the UE to look up the assigned SR periodicity and SR subframe offset within that period. For example, SR periodicities may have values of 1, 2, 5, 10, 20, 40, or 80 subframes (each subframe is 1 ms in length). SR subframe offsets may have non-negative integer values less than the value of SR periodicity.

When a UE receives downlink transmissions on the PDSCH for which it has to send an ACK/NACK signal back to the eNB, the same UE may also have pending uplink traffic to transmit which in turn triggers pending scheduling requests. For example, if the channel conditions between the UE and the eNB are poor, the UE may be configured with ACK/NACK repetition for greater reception reliability. It is therefore possible that the UE may wish to transmit both a pending SR and an ACK/NACK repetition signal in the same uplink subframe. It is important that both the SR and the ACK/NACK repetition signal are received at the eNB such that the uplink traffic at the UE may be transmitted in a timely fashion via granting of uplink resources to the UE by the eNB, and that the eNB may have the knowledge of whether the downlink transmission on PDSCH is received successfully at the UE. If an SR is not received at the eNB within a certain period of time, the UE may fall back to a random access procedure in order to obtain uplink transmission resources, which typically causes additional latency. Implementations to handle the SR and ACK/NACK repetition signal collision at the same subframe are presented in this disclosure to maximize the probability that both the SR and ACK/NACK repetition signal can be received at the eNB successfully within a minimal time of delay.

Figure 6:
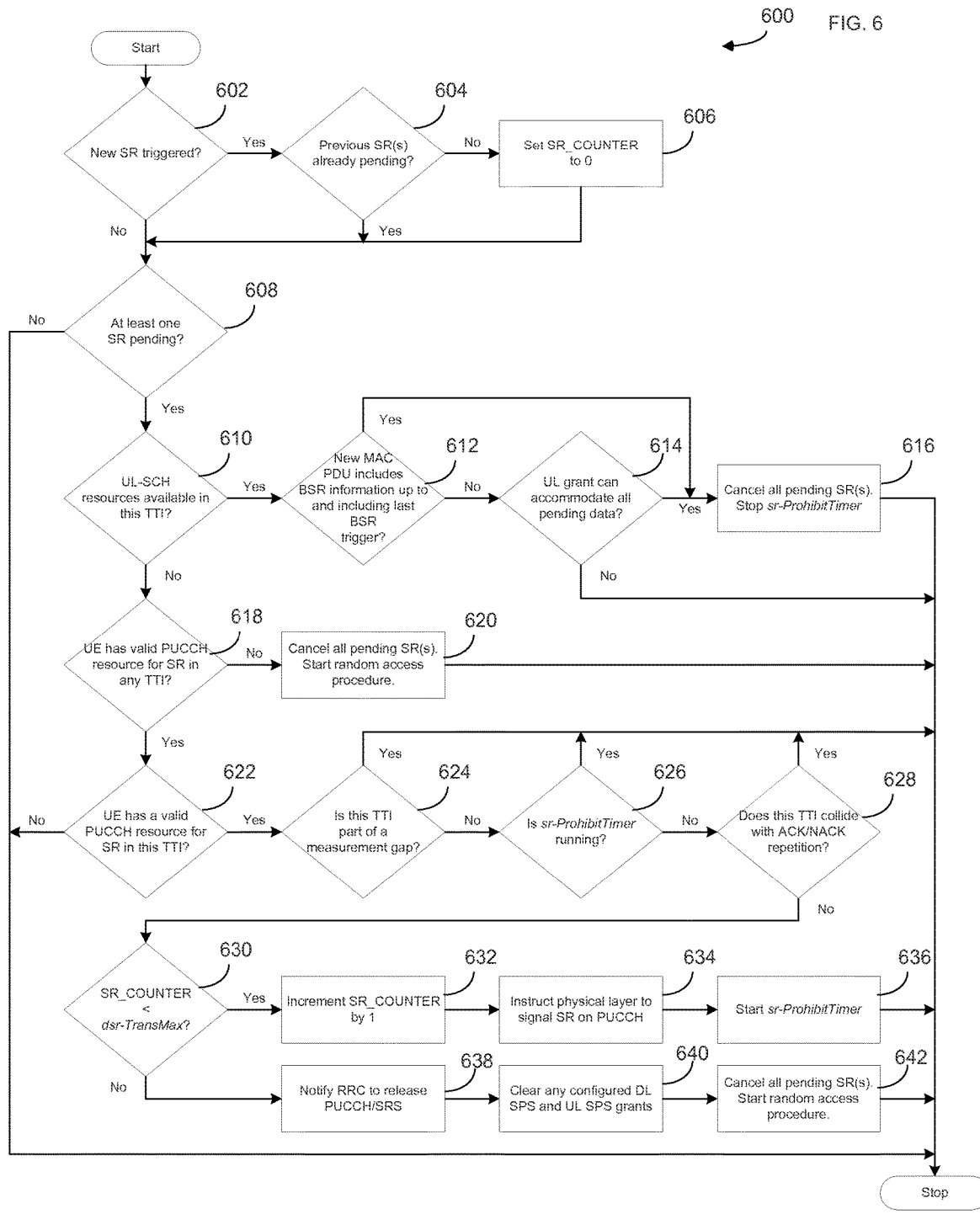
FIG. 6 is a flow chart illustrating an example method for handling a scheduling request collision with an ACK/NACK repetition signal using a medium access control (MAC) layer of user equipment.

FIG. 6 is a process flow chart 600 illustrating a method for handling a scheduling request collision with an ACK/NACK repetition signal by a MAC layer at a user equipment device. The illustrated implementation may be applied to a frequency division duplexing (FDD) or a time division duplexing (TDD) wireless communication system. In some implementations, the UE may be configured with only one serving cell and may not communicate using carrier aggregation. As shown in FIG. 6, the MAC layer at the UE may check whether a new SR is triggered at step 602. A new SR may be triggered when new uplink traffic arrives at the UE and no uplink resource is available for the newly arrived uplink traffic to be transmitted. By way of example, an SR may be triggered when a regular buffer status report (BSR) has been triggered but cannot be transmitted since no uplink grant for a new data transmission is available, or if the regular BSR was triggered by an event other than new uplink data for a logical channel. If a new SR is triggered at the UE, the UE may continue to check whether there is a previous SR pending at step 604. If no previous SR is pending, the MAC layer at the UE may set the SR counter value to 0. The SR counter keeps track of the number of transmitted SRs. The SR counter may have an integer value in the range from 0 to a maximum SR transmission number, inclusive. In this case, since the SR is newly triggered and no previous SR is pending, the MAC layer at the UE may set the value of SR counter to 0 to start a new SR counting cycle. If there are previous SRs pending at step 604, the MAC layer at the UE may not reset the SR counter value.

If no new SR is triggered at step 602, if there are previous SRs pending at step 604, or after the SR counter is set to 0 at step 606, the UE checks whether there is at least one SR pending at step 608. When a new SR is triggered, it may be considered pending until it is cancelled. Thus, when a new SR is triggered, there may be at least one SR pending at step 608. If no new SR is triggered and no previous SR is pending, then the condition of at least one SR pending is not satisfied at step 608. In this case, the UE may not transmit any SR or execute any of steps 610-642, because the UE does not have any pending SR. If there is at least one SR pending at step 608, the UE may to check whether there are any uplink shared channel (UL-SCH) resources available in this transmission time interval (TTI), as illustrated at step 610. A TTI may be equal in length to one subframe. A subframe may be configured to be 1 ms in length. The UL-SCH may be an uplink transport channel mapped directly to the PUSCH physical channel. If there are UL-SCH resources available in this TTI, the UE may check whether the new MAC protocol data unit (PDU) includes BSR information up to and including the last event that triggered a BSR or includes all pending data available for transmission. If the new MAC PDU does include BSR information up to and including the last event that triggered a BSR or includes all pending data available for transmission, the MAC layer at the UE may cancel all pending SRs and stop the SR prohibit timer at step 616. If the new MAC PDU does not include BSR information up to and including the last BSR trigger at step 612, the UE may check whether the uplink (UL) grant can accommodate all pending data at step 614. If the UL grant can accommodate the pending data at step 614, the MAC layer of the UE may cancel the pending SRs and stop the SR prohibit timer at step 616, and skip steps 618-642 regarding to SR transmission. Otherwise, the UE may not cancel the pending SRs or stop the SR prohibit timer but may skip steps 618-642 in the process flow diagram.

If there is no UL-SCH resource available in the TTI at step 610, the UE may check whether a valid PUCCH resource is available for the pending SR transmission in any TTI at step 618. If no valid PUCCH resource is available for the pending SR transmission in any TTI, the UE may cancel the pending SRs and start a random access procedure at step 620. The UE may not continue to execute any of steps 622-642 at this point. A random access procedure is an alternative method for the UE to signal to an eNB that uplink transmission resources are required. The random access procedure may be contention-based which typically introduces additional latency before the UE obtains a useable uplink grant. The UE may consume more transmission power and cell resources during a random access procedure as compared to an SR transmission.

If there is a valid PUCCH resource available for SR transmission in any TTI, the UE may continue to check whether a valid resource for SR transmission is available in this TTI at step 622. If no valid PUCCH resource for SR transmission is available in this TTI, the UE may stop the SR processing for this TTI and skip steps 624-642. Otherwise, the UE moves on to check whether this TTI is part of a measurement gap at step 624. A UE may make measurements of other cells which either are E-UTRA but which operate on a different frequency band or which belong to a different radio access technology (RAT) completely. UEs may only have one radio for receiving, and hence may tune away this radio from the operating frequency band of its serving cell in order to make inter-frequency and/or inter-RAT measurements. In order to facilitate this, an eNB may configure a UE with measurement gaps, during which the UE is allowed to tune away from the operating frequency band of its serving cell. Consequently, a UE cannot receive from nor transmit to the serving cell during a configured measurement gap. If a measurement gap occurs at the time of a pending SR transmission, the SR transmission may not take place. Therefore, if this TTI is part of a measurement gap at step 624, the UE may also stop the SR processing for this TTI and skip steps 626-642.

If this TTI is not part of a measurement gap, the UE checks whether the SR prohibit timer is running at step 626. The SR prohibit timer may prevent transmission of the pending SRs before the SR prohibit timer expires. The value of the SR prohibit timer may be configured via the MAC-MainConfig information element. The value of the SR prohibit timer may represent a multiple of the SR periodicity, which may be equal to an SR period multiplied by an integer in the range from 0 to 7, inclusive. If the SR prohibit timer is running at step 626, the UE may not transmit any pending SR or execute any of the steps 628-642. Instead, the SR processing for the UE in the TTI may complete if the SR prohibit timer is running. If the SR prohibit timer is not running, the UE may check whether the pending SR transmission in this TTI collides with an ACK/NACK repetition signal at step 628. The ACK/NACK repetition signal is part of the ACK/NACK repetition sequence, which may comprise the ACK/NACK signal repeated 2, 4, or 6 times in consecutive uplink subframes. If the UE determines that the pending SR transmission collides with an ACK/NACK repetition signal in this TTI, the MAC layer at the UE may not transmit the pending SR. Further, the MAC layer at the UE may refrain from incrementing the SR counter, refrain from instructing the physical layer of the UE to signal the pending SR, and/or refrain from starting the SR prohibit timer. By refraining from the incrementing the SR counter and starting the SR prohibit timer, the number of opportunities for the UE to transmit a pending SR may not be reduced. By refraining from instructing the physical layer of the UE to signal the pending SR, the pending SR may not be transmitted in this TTI due to the collision with the ACK/NACK repetition signal. By refraining from starting the SR prohibit timer, the UE may not have to wait additional time for the SR prohibit timer to expire before the next allowable SR transmission opportunity occurs. In other words, the UE may simply wait until its next SR opportunity to signal an SR when there is a collision between a pending SR transmission and an ACK/NACK repetition signal. This may ensure that the UE has the same chance of successfully completing a scheduling request procedure without falling back to the random process procedure, regardless of how many collisions between the pending SR transmission and the ACK/NACK repetition signal occur.

If there is no collision between a pending SR transmission and an ACK/NACK repetition signal in this TTI, the UE follows steps 630-642 for a normal SR transmission procedure. The UE may check whether the value of SR counter is less than the maximum SR transmission number at step 630. If the value of the SR counter is equal to or greater than the maximum SR transmission number, the MAC layer of the UE may notify the RRC to release the PUCCH resource for SR and SRS resources at step 638, clear any configured downlink semi-persistent scheduling (SPS) and uplink SPS grants at step 640, cancel all pending SRs and initiate a random access procedure at 642. The maximum SR transmission number may be configured by an eNB via the SchedulingRequestConfig information element and may have a value of 4, 8, 16, 32, or 64. If the value of the SR counter is less than the maximum SR transmission number, the MAC layer at the UE may increment the value of the SR counter by one at step 632, instruct the physical layer to signal SR on PUCCH at step 634, and start the SR prohibit timer at step 636. Therefore, after the actual transmission of a pending SR in this TTI, the effective number of SR transmission opportunities left is reduced by one and the UE may not transmit another SR before the SR prohibit timer expires.

FIG. 7 is a process flow chart 700 illustrating an alternative method for handling a scheduling request collision with an ACK/NACK repetition signal by a physical layer at a user equipment device. The illustrated implementation may be applied to a FDD or a TDD wireless communication system. In some implementations, the UE may be configured with only one serving cell and may not communicate using carrier aggregation. In the illustrated implementation 700, the pending SR transmission may be transmitted with the ACK/NACK repetition signal in the same TTI even if the pending SR transmission collides with the ACK/NACK repetition signal. As shown in FIG. 7, the UE first checks whether an ACK/NACK signal is scheduled for transmission in the current subframe at step 702. The ACK/NACK signal may be part of an ACK/NACK repetition sequence which comprises the ACK/NACK signal repeated multiple times in consecutive uplink subframes. If no ACK/NACK signal is scheduled for transmission in the current subframe, the UE checks whether a pending SR is scheduled for transmission in the current subframe at step 704. If there is a pending SR, the UE may transmit the pending SR on an SR PUCCH resource at step 706. The UE may increment the SR counter by one and start the SR prohibit timer after transmitting the pending SR transmission. Otherwise, if there is no SR transmission or ACK/NACK signal to be transmitted in current subframe at step 704, the UE may stop the SR operation for this subframe at this point.

If an ACK/NACK signal is scheduled for transmission in the current subframe at step 702, the UE may check whether a pending SR is also scheduled for transmission in the current subframe at step 708. If a pending SR is scheduled for transmission with an ACK/NACK signal in the same subframe, the UE may transmit the ACK/NACK signal on the SR PUCCH resource at step 712. The SR PUCCH resource for the UE may be assigned by the eNB via a RRC message. The UE may increment the SR counter by one and start the SR prohibit timer after transmitting the pending SR transmission. The eNB may decode the ACK/NACK signal on SR PUCCH resource. If there is an ACK/NACK signal detected on the SR PUCCH resource, the eNB may consider a positive SR is received. Subsequently the eNB may provide uplink resources to the UE by an uplink grant. Otherwise, if no pending SR is scheduled for transmission with the ACK/NACK signal, the UE may transmit the ACK/NACK signal on an ACK/NACK PUCCH resource at step 710. The eNB may then decode the ACK/NACK signal on the ACK/NACK PUCCH resource. The PUCCH resource for a first ACK/NACK signal of an ACK/NACK repetition sequence may be derived from the PDCCH control channel element (CCE) location for a PDSCH reception dynamically received on the PDCCH. For a downlink SPS reception on the PDSCH, the PUCCH resource for a first ACK/NACK signal of an ACK/NACK repetition sequence may be configured by the eNB. Subsequent PUCCH resource for the remainder of the ACK/NACK repetition sequence may be semi-statically assigned by the eNB as part of the ACK/NACK repetition configuration. Since no SR or ACK/NACK signal is detected on the SR PUCCH resource, the eNB may consider that no SR transmission from the UE is received.

While several implementations have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it may be understood that various omissions and substitutions and changes in the form and details of the system illustrated may be made by those skilled in the art, without departing from the intent of the disclosure.

What is claimed is:

1. A method in a user equipment (UE) comprising:
   determining that there is a pending scheduling request (SR) transmission for a subframe;
   determining whether the subframe is part of a measurement gap;
   in response to determining that the subframe is not part of the measurement gap, determining that the pending SR transmission collides with a transmission of a repeated acknowledgement/negative acknowledgement (ACK/NACK) signal in the same frame, the repeated ACK/NACK signal being part of an ACK/NACK repetition sequence, wherein the ACK/NACK repetition sequence comprises an ACK/NACK signal and at least one repeated ACK/NACK signal;
   responsive to the determining, refraining from transmitting the pending SR transmission; and
   responsive to the determining, refraining from incrementing an SR counter.

2. The method of claim 1, further comprising:
   responsive to the determining that the pending SR transmission collides with the transmission of the repeated ACK/NACK signal, refraining from instructing a physical layer of the UE to signal the pending SR.

3. The method of claim 1, further comprising:
   responsive to the determining that the pending SR transmission collides with the transmission of the repeated ACK/NACK signal, refraining from starting an SR prohibit timer.

4. The method of claim 3, wherein the SR prohibit timer has a value equal to an SR period multiplied by an integer in a range from 0 to 7, inclusive.

5. The method of claim 1, further comprising transmitting a subsequent SR transmission.

6. The method of claim 5, wherein the subsequent SR transmission is transmitted on a physical uplink control channel (PUCCH).

7. The method of claim 1, further comprising determining that a physical uplink control channel (PUCCH) resource is available for the pending SR transmission prior to determining that the pending SR transmission collides with the repeated ACK/NACK signal.

8. The method of claim 1, wherein the ACK/NACK signal is transmitted on an uplink in response to a physical downlink shared channel (PDSCH) reception.

9. The method of claim 1, wherein the ACK/NACK repetition sequence comprises the ACK/NACK signal repeated 2, 4, or 6 times in consecutive uplink subframes.

10. The method of claim 1, wherein the SR counter has an integer value in a range from 0 to a configured number, inclusive.

* * * * *